United States Patent [19]

Mish et al.

[11] Patent Number: 5,986,569
[45] Date of Patent: Nov. 16, 1999

[54] RADIO FREQUENCY IDENTIFICATION SYSTEM, RADIO FREQUENCY IDENTIFICATION DEVICE PACKAGE, AND METHOD OF USE OF RADIO FREQUENCY IDENTIFICATION DEVICE

[75] Inventors: William Mish; Mark E. Tuttle; John R. Tuttle, all of Boise; Rickie C. Lake, Eagle, all of Id.

[73] Assignee: Micron Communications, Inc., Boise, Id.

[21] Appl. No.: 08/821,234

[22] Filed: Mar. 20, 1997

[51] Int. Cl.$^6$ .................................................. H04Q 5/22
[52] U.S. Cl. .................... 340/825.54; 235/375; 343/702; 343/848
[58] Field of Search ................................ 235/375, 462.15, 235/439, 382, 435, 441, 482; 343/702, 846, 848, 767; 361/818, 778, 600, 616, 667, 679, 724, 725; 257/659; 455/300; 340/825.54, 825.72, 825.69, 572.8, 572.5, 572.1, 572.7, 693.5, 693.7, 693.9, 932.2, 693.2, 32.1, 545.6, 548, 568.4; 49/373; 354/108

[56] References Cited

U.S. PATENT DOCUMENTS

| | | |
|---|---|---|
| 4,075,632 | 2/1978 | Baldwin et al. .......................... 343/6.8 |
| 4,926,182 | 5/1990 | Ohta et al. ................................ 342/44 |
| 5,010,462 | 4/1991 | Mintzer .................................... 362/109 |
| 5,384,610 | 1/1995 | Brown et al. ............................ 354/108 |
| 5,562,787 | 10/1996 | Koch et al. ............................... 156/64 |
| 5,621,412 | 4/1997 | Sharpe et al. ............................. 342/51 |
| 5,649,296 | 7/1997 | MacLellan et al. ..................... 455/38.2 |

*Primary Examiner*—Michael Horabik
*Assistant Examiner*—Jean B. Jeanglaude
*Attorney, Agent, or Firm*—Wells, St. John, Roberts, Gregory & Matkin P.S.

[57] ABSTRACT

In one aspect, a radio frequency identification system includes a) a radio frequency identification device having a receiver, a transmitter and a microprocessor; b) a pocket containing the radio frequency identification device, the pocket having a front panel and a rear panel joined with the front panel; c) an adhesive layer adhered to the rear panel of the pocket; and d) a release backing material removably adhered to the adhesive layer. In another aspect, a radio frequency identification device package includes a pocket configured for receipt of a radio frequency identification device. The pocket has a front panel and a rear panel joined with the front panel. The front panel has a break-away portion. The device package also includes a pull tab joined with the break-away portion and configured to be grasped by a human hand.

31 Claims, 2 Drawing Sheets

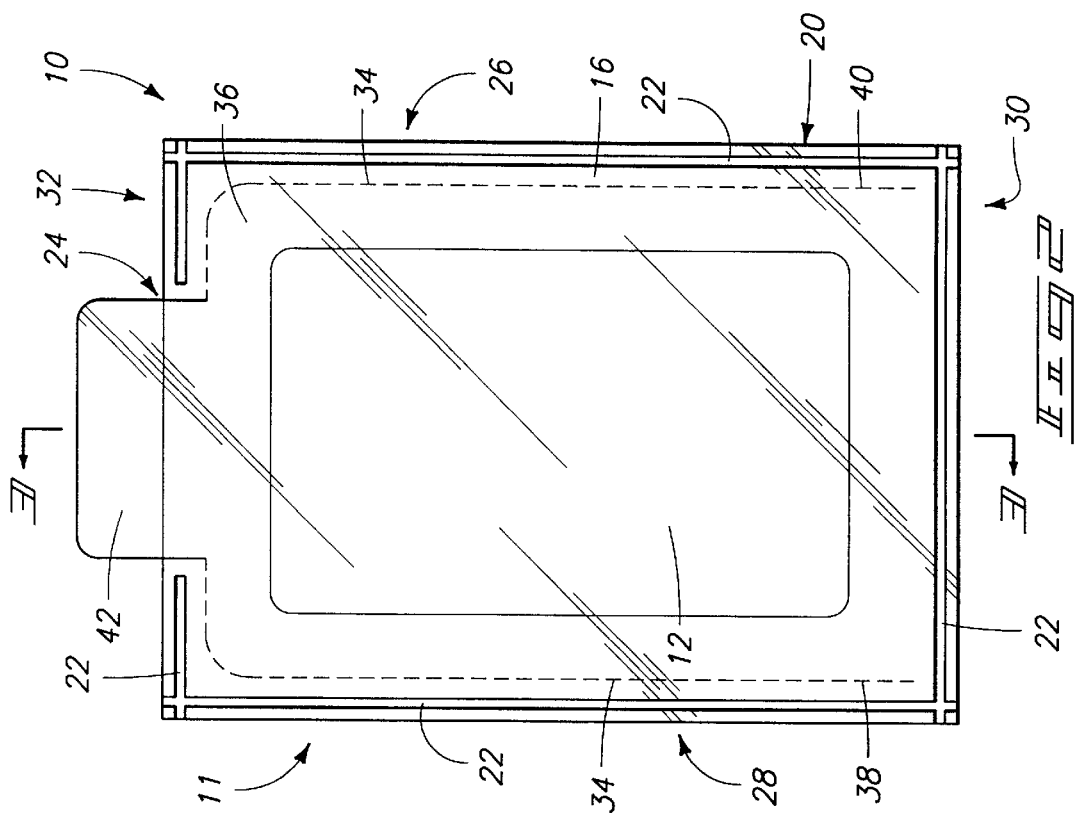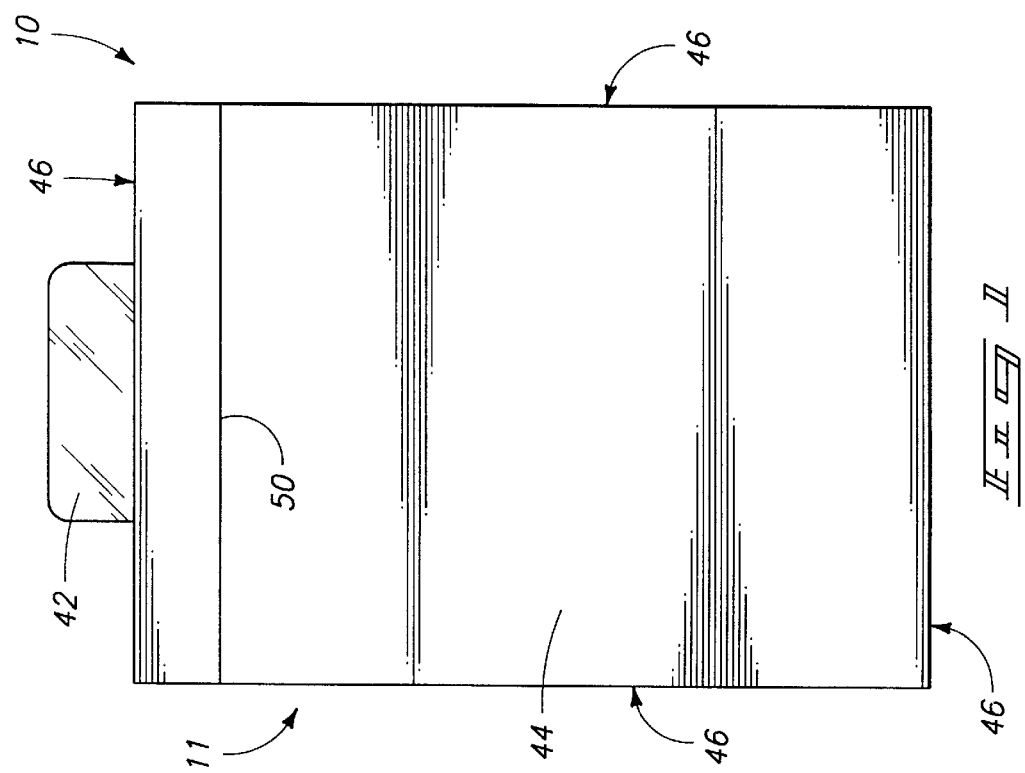

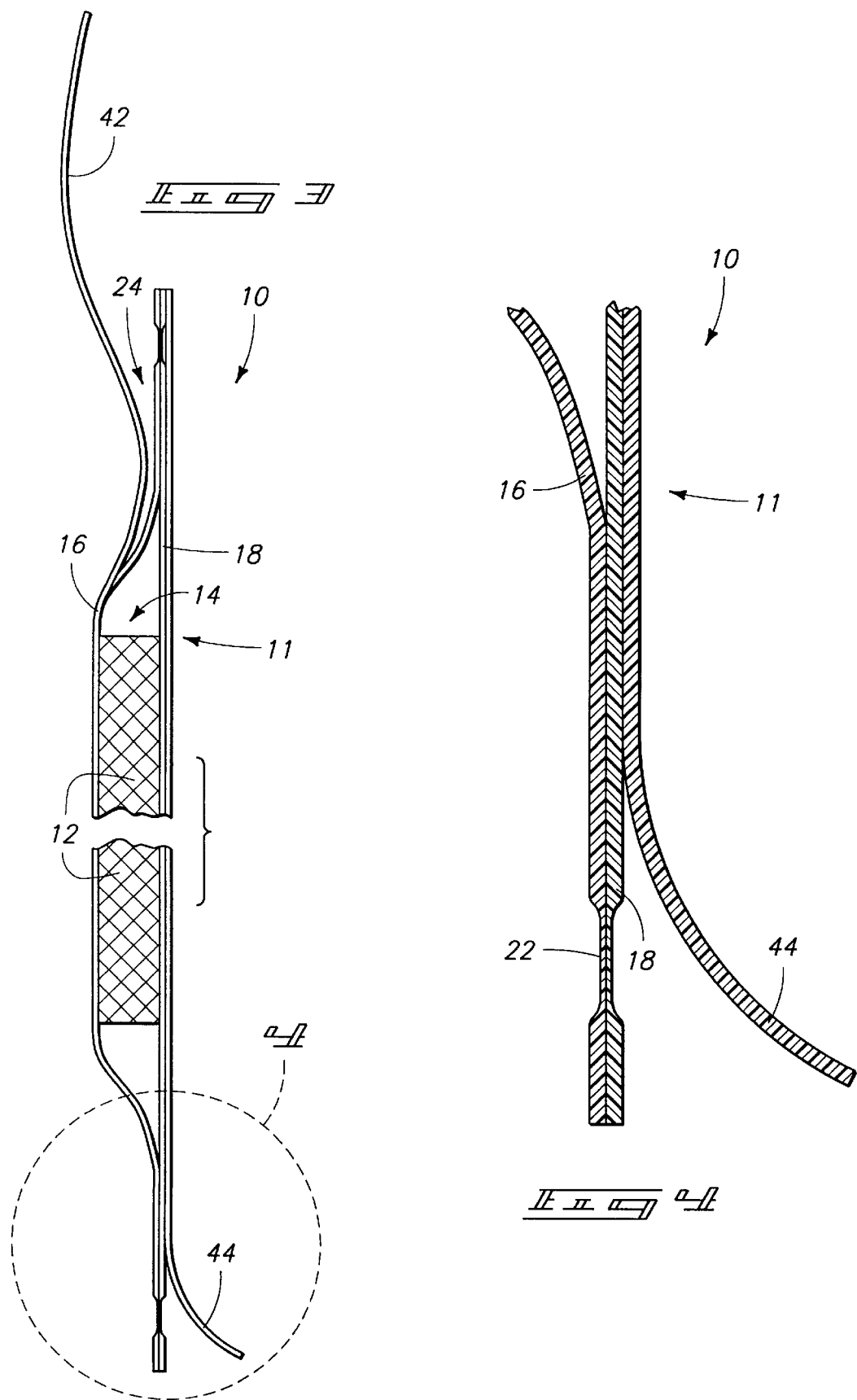

RADIO FREQUENCY IDENTIFICATION SYSTEM, RADIO FREQUENCY IDENTIFICATION DEVICE PACKAGE, AND METHOD OF USE OF RADIO FREQUENCY IDENTIFICATION DEVICE

TECHNICAL FIELD

This invention pertains to radio frequency identification systems, radio frequency identification device packages, and methods of use of radio frequency identification devices.

BACKGROUND OF THE INVENTION

As large numbers of objects are moved in inventory, product manufacturing, and merchandising operations, there is a continuous challenge to accurately monitor the location and flow of objects. Additionally, there is a continuing goal to determine the location of objects in an inexpensive and streamlined manner. Furthermore, there is a need for tag devices suitably configured to mount to a variety of objects including goods, items, persons, or animals, or substantially any moving or stationary animate or inanimate objects.

One way of tracking objects is with an electronic identification system. An exemplary electronic identification system is described in U.S. patent application Ser. No. 08/705,043, which names James O'Toole, John R. Tuttle, Mark E. Tuttle, Tyler Lowrey, Kevin Devereaux, George Pax, Brian Higgins, Shu-Sun Yu, David Ovard and Robert Rotzoll as inventors, which was filed on Aug. 29, 1996, is assigned to the assignee of this patent application, and is fully incorporated herein by reference. Such exemplary radio frequency identification device comprises an integrated circuit including a receiver, a transmitter and a microprocessor. The integrated circuit is preferably a monolithic single die integrated circuit including the receiver, the transmitter and the microprocessor. Preferably, the device further comprises a battery configured to power the integrated circuit. Also preferably, the radio frequency identification device comprises a single die including a receiver, a transmitter and a microprocessor, and the die has a size of less than 90,000 mils$^2$, more preferably the die has a size of less than 300×300 mils$^2$, even more preferably, the die has a size of less than 37,500 mils, and even more preferably, the die has a size of 209×116 mils$^2$.

A radio frequency identification device, such as the device of patent application Ser. No. 08/705,043, can be a radio frequency (RF) transponder device. When an RF transponder device is utilized in an electronic identification system, the identification system typically comprises an interrogator which is utilized to transmit a command, commonly referred to as an interrogation signal, to the transponder device. The transponder device receives the command and transmits an identification code in response to the command. Transponder devices can frequently be used for substantial lengths of time, permitting them to be reused in multiple inventory control or tracking systems.

It is desirable to develop packaging and packaging methods suitable for storing and using radio frequency identification devices.

SUMMARY OF THE INVENTION

The present invention encompasses a radio frequency identification system which includes a radio frequency identification device and a pocket containing the radio frequency identification device. In one embodiment of the invention, the pocket includes a pull tab and a break-away portion joined to the pull tab. The pull tab and break-away portion are configured to enable one-handed opening of the pocket for removal of a radio frequency identification device from the pocket.

The invention further encompasses a radio frequency identification device package which includes a pocket configured for receipt of a radio frequency identification device. In an embodiment of the invention the package includes an adhesive layer adhered to the pocket and a release backing material removably adhered to the adhesive layer.

The invention further encompasses methods of utilizing a radio frequency identification device. In an exemplary method of the present invention, a radio frequency identification device is inserted into a package, the package is adhesively adhered to an item to label the item with the radio frequency device, and a command is transmitted to the radio frequency device to trigger the radio frequency identification device to transmit an identification code in response to the command.

BRIEF DESCRIPTION OF THE DRAWINGS

Preferred embodiments of the invention are described below with reference to the following accompanying drawings.

FIG. 1 is a rear elevational view of a radio frequency identification system of the present invention.

FIG. 2 is a front elevational view of the system of FIG. 1.

FIG. 3 is an exploded cross-sectional side view along the line labeled 3—3 in FIG. 2.

FIG. 4 is an exploded cross-sectional side view of the area labeled 4 in FIG. 3.

DETAILED DESCRIPTION OF THE PREFERRED EMBODIMENTS

This disclosure of the invention is submitted in furtherance of the constitutional purposes of the U.S. Patent Laws "to promote the progress of science and useful arts" (Article 1, Section 8).

A radio frequency identification system 10 encompassed by the present invention is described with reference to FIGS. 1–4. System 10 encompasses a radio frequency identification device (RFID) 12. RFID 12 preferably comprises an integrated circuit including a receiver, transmitter and a microprocessor (not shown), as described in the incorporated U.S. patent application Ser. No. 08/705,043. More preferably, as described in the incorporated U.S. patent application Ser. No. 08/705,043, RFID 12 comprises a monolithic single die integrated circuit including the receiver, the transmitter and the microprocessor, and even more preferably, RFID 12 further comprises a battery configured to power the integrated circuit.

Radio frequency identification system 10 further comprises a package 11 having a pocket 14 configured to contain RFID device 12. Pocket 14 comprises a front panel 16 and a rear panel 18. Preferably, front panel 16 and rear panel 18 are formed of plastic materials. More preferably, front panel 16 comprises a transparent material to enable viewing of an RFID device contained with pocket 14.

Front panel 16 comprises a periphery which defines an outer edge 20 of front panel 16. The periphery is preferably a rectangular-shaped periphery including a pair of opposing sides 26 and 28, and a pair of opposing ends 30 and 32. Rear panel 18 is joined to front panel 16 at a seal 22 which extends at about the periphery of front panel 16, but extends along less than an entirety of such periphery. The region of the front panel periphery along which seal 22 does not extend defines a displaceable peripheral portion 24 of front panel 16. Preferably, seal 22 is a heat seal formed by fusing the preferred plastic materials of panels 16 and 18 together. However, as will be appreciated by persons skilled in the art, seal 22 could also be formed by other methods, such as, for example, by applying adhesive between the layers 16 and 18. In the shown preferred embodiment, seal 22 extends along more than three-quarters of the periphery of front panel 16. Specifically, in the shown preferred embodiment seal 22 extends entirely along both opposing sides 26 and 28, entirely along opposing end 30, and partially along opposing end 32.

Front panel 16 further comprises perforations 34. Perforations 34 define a pattern, and within the pattern is a break-away portion 36 of the front panel having a periphery which comprises the pattern formed by perforations 34. The patterned formed by perforations 34 preferably comprises a pair of opposing rows 38 and 40 which extend inwardly of seal 22, and along both opposing sides 26 and 28. More preferably, perforations 34 extend along substantially all of a first length of opposing sides 26 and 28. Perforations 34 preferably do not extend along end 30 of front panel 16. Perforations 34 can be formed by conventional methods.

A pull tab 42 is joined with break-away portion 36 and preferably configured to be grasped by a human hand. Pull tab 42 is joined with displaceable peripheral portion 24 of front panel 16. Pull tab 42 and perforations 34 are preferably together configured to enable one-handed tearing of break-away portion 36 from pocket 14 for removal of radio frequency identification device 12 from the pocket. Such preferable one-handed tearing of break-away portion 36 will be discussed in more detail below with reference to a method of using radio frequency identification system 10.

Radio frequency identification system 10 preferably further comprises an adhesive layer (not shown) adhered to rear panel 18 of pocket 14, and a release backing material 44 removably adhered to the adhesive layer. The adhesive layer can comprise a number of adhesives known to persons of ordinary skill in the art, including glues and pastes. Release backing material 44 can comprise a number of materials known to persons of ordinary skill in the art, including fabrics and plastics. Release backing material 44 preferably substantially overlays rear panel 18 such that, as shown in FIG. 1, release backing material 44 and rear panel 18 (not shown in FIG. 1) comprise a substantially common outer periphery 46. Pull tab 42 extends beyond such outer periphery 46.

A slit 50 extends through release backing material 44 and rear panel 18, and is configured for insertion of radio frequency identification device 12 into pocket 14. Accordingly, slit 50 provides a means for inserting radio frequency device 12 into pocket 14 after formation of seal 22. In alternative embodiments encompassed by the invention, radio frequency identification device 12 can be inserted between panels 16 and 18 before completing formation of heat seal 22. In such alternative embodiments slit 50 can be eliminated.

In operation, a radio frequency identification device 12 is inserted into package 11. Release backing material 44 is then removed from package 11 to expose the adhesive layer on rear panel 18. Package 11 is attached to an item with the adhesive layer to label the item with radio frequency identification device 12. Subsequently, a command is transmitted to radio frequency identification device 12 to trigger radio frequency identification device 12 to transmit an identification code. Such identification code identifies the item to which package 11 is attached.

After attachment of package 11 to an item, radio frequency identification device 12 can be removed from package 11 by a person grasping pull tab 42 and subsequently displacing pull tab 42 relative to the rest of package 11 to tear perforations 34 and displace break-away portion 36. Such tearing of perforations 34 and displacement of break-away portion 36 opens package 11 and exposes radio frequency identification device 12 for removal. As discussed above, pull tab 42 and perforations 34 are preferably together configured to enable one-handed opening of package 11. Such one-handed opening can be accomplished once that package 11 is adhered to an item by grasping pull tab 42 with said one hand and displacing pull tab 42 relative to the rest of package 11 to tear perforations 34 and thereby open package 11.

In compliance with the statute, the invention has been described in language more or less specific as to structural and methodical features. It is to be understood, however, that the invention is not limited to the specific features shown and described, since the means herein disclosed comprise preferred forms of putting the invention into effect. The invention is, therefore, claimed in any of its forms or modifications within the proper scope of the appended claims appropriately interpreted in accordance with the doctrine of equivalents.

We claim:

1. A radio frequency identification system comprising:
    a radio frequency identification device comprising an integrated circuit including a receiver, a transmitter and a microprocessor;
    a pocket containing the radio frequency identification device, the pocket comprising a front panel and a rear panel joined with the front panel, the front panel having perforations extending therein, the perforations forming a pattern, the front panel having a break-away portion, the break-away portion having a periphery which comprises the pattern formed by the perforations;
    a pull tab joined with the break-away portion and configured to be grasped by a human hand; the pull tab and perforations being together configured to enable one-handed tearing of the break-away portion of the perforated front panel from the pocket for opening of the pocket and removal of the radio frequency identification device from the pockets;
    an adhesive layer adhered to the rear panel of the pocket; and
    a release backing material removably adhered to the adhesive layer.

2. The system of claim 1 wherein the integrated circuit is a monolithic single die integrated circuit including the receiver, the transmitter, and the microprocessor.

3. The system of claim 1 wherein the radio frequency identification device further comprises a battery configured to power the integrated circuit.

4. The system of claim 1 wherein the rear panel has an outer periphery, the pull tab extending beyond the outer periphery of the rear panel.

5. The system of claim 1 further comprising a slit in the rear panel configured for insertion of the radio frequency identification device into the pocket.

6. The system of claim 1 wherein the front panel comprises a rectangular-shaped periphery and wherein the perforations extend along opposing sides of the rectangular-shaped periphery but do not extend along at least one end of the rectangular-shaped periphery.

7. The system of claim 1 wherein the front panel comprises:

a rectangular-shaped periphery, the rectangular-shaped periphery comprising a pair of opposing sides having a first length, and a pair of opposing ends having a second length; the first length being greater than the second length; and wherein the perforations extend along substantially all of the first length of the opposing sides of the rectangular-shaped periphery.

8. A radio frequency identification device package comprising:

a pocket configured for receipt of a radio frequency identification device, the pocket comprising a front panel and a rear panel joined with the front panel, the front panel having perforations extending therein, the perforations forming a pattern, the front panel having a break-away portion, the break-away portion having a periphery which comprises the pattern formed by the perforations; and a pull tab joined with the break-away portion and configured to be grasped by a human hand; the pull tab and perforations being together configured to enable one-handed tearing of the break-away portion of the perforated front panel from the pocket for opening of the pocket and removal of the radio frequency identification device from the pocket.

9. The package of claim 8 wherein the patterned formed by the perforations comprises two rows.

10. The package of claim 8 further comprising an adhesive layer adhered to the rear panel of the pocket.

11. The package of claim 8 further comprising:

an adhesive layer adhered to the rear panel of the pocket; and a release backing material removably adhered to the adhesive layer.

12. The package of claim 8 wherein the rear panel has an outer periphery, the pull tab extending beyond the outer periphery of the rear panel.

13. The package of claim 8 further comprising a slit in the rear panel configured for insertion of the radio frequency identification device into the pocket.

14. The package of claim 8 wherein the front panel comprises a rectangular-shaped periphery and wherein the perforations extend along opposing sides of the rectangular-shaped periphery but do not extend along at least one end of the rectangular-shaped periphery.

15. The package of claim 8 wherein the front panel comprises:

a rectangular-shaped periphery, the rectangular-shaped periphery comprising a pair of opposing sides having a first length, and a pair of opposing ends having a second length; the first length being greater than the second length; and wherein the perforations extend along substantially all of the first length of the opposing sides of the rectangular-shaped periphery.

16. A radio frequency identification device package comprising:

a pocket configured for receipt of the radio frequency identification device, the pocket comprising:

a front panel comprising a periphery which defines an outer edge of the front panel;

a rear panel joined with the front panel at a seal which extends at about the periphery of the front panel, the seal extending along less than an entirety of the periphery of the front panel to leave a displaceable peripheral portion of the front panel periphery;

a pull tab joined with the front panel and configured to be grasped by a human hand, the pull tab joined with the displaceable peripheral portion of the front panel periphery;

perforations extending into the front panel and forming a pattern inwardly of the seal, the pattern comprising a pair of opposing rows of perforations which extend to the pull tab; and a break-away portion of the front panel between the opposing rows of perforations and joined with the pull tab, the pull tab and perforations being together configured to couple displacing of the pull tab to tearing of the opposing rows of perforations and displacement of the break-away portion of the front panel, the pocket being configured to enable removal of the radio frequency identification device from the pocket once the perforations are torn and the break-away portion is displaced; an adhesive layer adhered to the rear panel of the pocket; and a release backing material removably adhered to the adhesive layer.

17. The package of claim 16 wherein the seal extends along more than three-quarters of the periphery of the front panel.

18. The package of claim 16 further comprising a slit in the rear panel configured for insertion of the radio frequency identification device into the pocket.

19. The package of claim 16 wherein the front panel comprises a rectangular-shaped periphery and wherein the perforations extend along opposing sides of the rectangular-shaped periphery but do not extend along an end of the rectangular-shaped periphery.

20. The package of claim 16 wherein the front panel comprises a rectangular-shaped periphery comprising a pair of opposing sides and a pair of opposing ends, and wherein the seal extends entirely along the opposing sides of the rectangular-shaped periphery and entirely along one of the ends of the rectangular-shaped periphery.

21. The package of claim 16 wherein the front panel comprises a rectangular-shaped periphery comprising a pair of opposing sides and a pair of opposing ends, and wherein the seal extends entirely along the opposing sides of the rectangular-shaped periphery, entirely along one of the opposing ends of the rectangular-shaped periphery, and partially along the other of the opposing ends of the rectangular-shaped periphery.

22. The package of claim 16 wherein the front panel comprises a rectangular-shaped periphery comprising a pair of opposing sides and a pair of opposing ends, wherein the seal extends entirely along the opposing sides of the rectangular-shaped periphery and entirely along a first of the ends of the rectangular shaped periphery, and wherein the perforations extend along the opposing sides of the rectangular-shaped periphery but do not extend along said first of the ends of the rectangular shaped periphery.

23. The package of claim 16 wherein the perforations do not extend entirely around the seal.

24. The package of claim 16 wherein the rear panel has an outer periphery, the pull tab extending beyond the outer periphery of the rear panel.

25. A method of utilizing a radio frequency identification device comprising the following steps:

inserting a radio frequency identification device into a package, the package comprising:

a pocket configured for receipt of the radio frequency identification device, the pocket comprising a front panel and a rear panel joined with the front panel, the front panel having perforations extending therein, the perforations forming a pattern, the front panel having a break-away portion, the break-away portion having a periphery which comprises the pattern formed by the perforations;

an adhesive layer adhered to the rear panel of the pocket;

a release backing material removably adhered to the adhesive layer; and a pull tab joined with the break-away portion and configured to be grasped by a human hand; the pull tab and perforations being together configured to enable one-handed opening of the perforated front panel for removal of the radio frequency identification device from the pocket;

removing the release backing material to expose the adhesive layer;

adhering the package to an item with the exposed adhesive layer to label the item with the radio frequency identification device; and transmitting a command to the radio frequency identification device to trigger the radio frequency identification device to transmit an identification code in response to the command.

26. The method of claim 25 further comprising:

removing the radio frequency identification device from the item by displacing the pull tab to tear the perforations and displace the break-away portion to expose the radio frequency identification device for removal.

27. The method of claim 25 wherein the rear panel comprises a slit configured for insertion of a radio frequency identification device into the pocket, and wherein the step of inserting the radio frequency identification device into the package comprises inserting the radio frequency identification device through the slit in the rear panel.

28. The method of claim 25 further comprising forming a seal between the front and rear panels to join the front and rear panels, and wherein the step of inserting the radio frequency identification device into the package comprises positioning the radio frequency identification device between the front panel and the rear panel before completing formation of the seal between the front and rear panels.

29. A method of utilizing a radio frequency identification device comprising the following steps:

inserting a radio frequency identification device into a package, the package comprising:
  a pocket configured for receipt of the radio frequency identification device, the pocket comprising:
    a front panel comprising a periphery which defines an outer edge of the front panel;
    a rear panel joined with the front panel at a seal which extends at about the periphery of the front panel, the seal extending along less than an entirety of the periphery of the front panel to leave a displaceable peripheral portion of the front panel periphery;
    a pull tab joined with the displaceable peripheral portion of the front panel periphery and configured to be grasped by a human hand;
    perforations extending into the front panel and forming a pattern inwardly of the seal, the pattern comprising a pair of opposing rows extending to the pull tab; and
    a break-away portion of the front panel between the opposing rows of perforations and integral with the pull tab, the break-away portion of the front panel being configured to be displaced and to enable removal of the radio frequency identification device from the pocket once the break-away portion is displaced, the pull tab and perforations being together configured to couple displacing of the pull tab to tearing of the opposing rows of perforations and displacing of the break-away portion of the front panel;
  an adhesive layer adhered to the rear panel of the pocket; and
  a release backing material removably adhered to the adhesive layer;

removing the release backing material to expose the adhesive layer;

attaching the package to an item to label the item with the radio frequency identification device;

transmitting a command to the radio frequency identification device to trigger the radio frequency identification device to transmit an identification code in response to the command; and removing the radio frequency identification device from the item by displacing the pull tab to tear the opposing rows of perforations and displace the break-away portion to expose the radio frequency identification device for removal.

30. The method of claim 29 wherein the rear panel comprises a slit configured for insertion of a radio frequency identification device into the pocket, and wherein the step of inserting the radio frequency identification device into the package comprises inserting the radio frequency identification device through the slit in the rear panel.

31. The method of claim 29 further comprising forming the seal between the front and rear panels, and wherein the step of inserting the radio frequency identification device into the package comprises positioning the radio frequency identification device between the front panel and the rear panel before completing formation of the seal between the front and rear panels.

* * * * *

UNITED STATES PATENT AND TRADEMARK OFFICE
CERTIFICATE OF CORRECTION

PATENT NO : 5,986,569
DATED : November 16, 1999
INVENTOR(S) : William Mish et al.

It is certified that error appears in the above-identified patent and that said Letters Patent are hereby corrected as shown below:

Col. 1, line 43
  replace "mils"
  with --mils2--.  (Super Script "2")

Signed and Sealed this

Third Day of April, 2001

*Attest:*

NICHOLAS P. GODICI

*Attesting Officer*  *Acting Director of the United States Patent and Trademark Office*